(12) United States Patent
Breslau et al.

(10) Patent No.: US 8,055,841 B2
(45) Date of Patent: Nov. 8, 2011

(54) SYSTEM AND METHOD FOR CACHING DATA ON A HARD DISK DRIVE

(75) Inventors: Franklin Charles Breslau, Teaneck, NJ (US); Ori Pomerantz, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/388,599

(22) Filed: Feb. 19, 2009

(65) Prior Publication Data

US 2010/0211730 A1   Aug. 19, 2010

(51) Int. Cl.
*G06F 12/06* (2006.01)

(52) U.S. Cl. .............. 711/113; 711/112; 711/4

(58) Field of Classification Search .......... None
See application file for complete search history.

(56) References Cited

U.S. PATENT DOCUMENTS

| | | | |
|---|---|---|---|
| 5,345,347 A | 9/1994 | Hopkins et al. | |
| 5,371,855 A | 12/1994 | Idleman et al. | |
| 5,627,990 A | 5/1997 | Cord et al. | |
| 5,696,931 A | 12/1997 | Lum et al. | |
| 5,774,682 A | 6/1998 | Benhase et al. | |
| 5,930,481 A | 7/1999 | Benhase et al. | |
| 6,047,359 A | 4/2000 | Fouts | |
| 6,662,273 B1 | 12/2003 | Wilkerson et al. | |
| 2003/0004981 A1 | 1/2003 | Kaneda et al. | |
| 2006/0072400 A1 | 4/2006 | Anderson et al. | |
| 2006/0253650 A1* | 11/2006 | Forrer et al. | 711/113 |
| 2007/0019511 A1 | 1/2007 | Isozaki et al. | |
| 2007/0097801 A1 | 5/2007 | Ohishi | |
| 2009/0070526 A1* | 3/2009 | Tetrick et al. | 711/113 |

FOREIGN PATENT DOCUMENTS

| | | |
|---|---|---|
| EP | 0080878 A2 | 6/1983 |
| JP | 64023355 | 1/1989 |
| JP | 4047555 | 2/1992 |
| JP | 5041037 | 2/1993 |
| JP | 2000172448 | 6/2000 |
| WO | 9953422 A1 | 10/1999 |

* cited by examiner

*Primary Examiner* — Than Nguyen
(74) *Attorney, Agent, or Firm* — Schmeiser, Olsen & Watts; Anna L. Linne

(57) ABSTRACT

A method for caching data on a hard disk drive. The method begins by identifying at least one track residing on the hard disk drive to devote to caching. The method continues with determining an average for each data value both residing on the hard disk drive and not residing in random access memory. The average value being the average number of times a given data value was read into memory before being the given data value was overwritten. Next the method detects a period of hard disk activity and in response to detecting, the method concludes by copying to each cache track each data value not residing in random access memory and having an average which exceeds a first threshold.

24 Claims, 3 Drawing Sheets

SYSTEM AND METHOD FOR CACHING DATA ON A HARD DISK DRIVE

BACKGROUND OF THE INVENTION

The present invention relates generally to caching data, and more particularly to caching data on a hard disk drive (HDD) for better read performance.

Conventionally, cache is a portion of memory (i.e. random access memory; RAM) used to temporarily store frequently accessed data. Caching is the process of copying the frequently accessed data to memory where the data is expensive (time wise) to fetch in its original location.

As software applications grow ever larger, so too does the amount of data required to run the applications. Additionally, modern computers are able to multitask a significant number of applications further reducing the available space within memory to store frequently accessed data.

Memory being a finite resource, it is inevitable that an application will request data not residing in cache requiring a trip to the hard disk drive (HDD) to retrieve said data. Hard disk drives (HDD) being an order of magnitude slower than memory account for a large portion of the expense (time wise) involved in computing.

SUMMARY OF THE INVENTION

The present invention provides a method for caching data on a hard disk drive, said method comprising:

identifying at least one track to devote to said caching, each track of said at least one track residing on said hard disk drive;

determining an average for each data value both residing on said hard disk drive and not residing in random access memory, said average being the average number of times a given data value was read into memory before said given data value is overwritten;

detecting a period of hard disk activity; and in response to said detecting, copying to each track of said at least one track each data value not residing in said random access memory and having an average which exceeds a first threshold.

DETAILED DESCRIPTION OF THE DRAWINGS

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
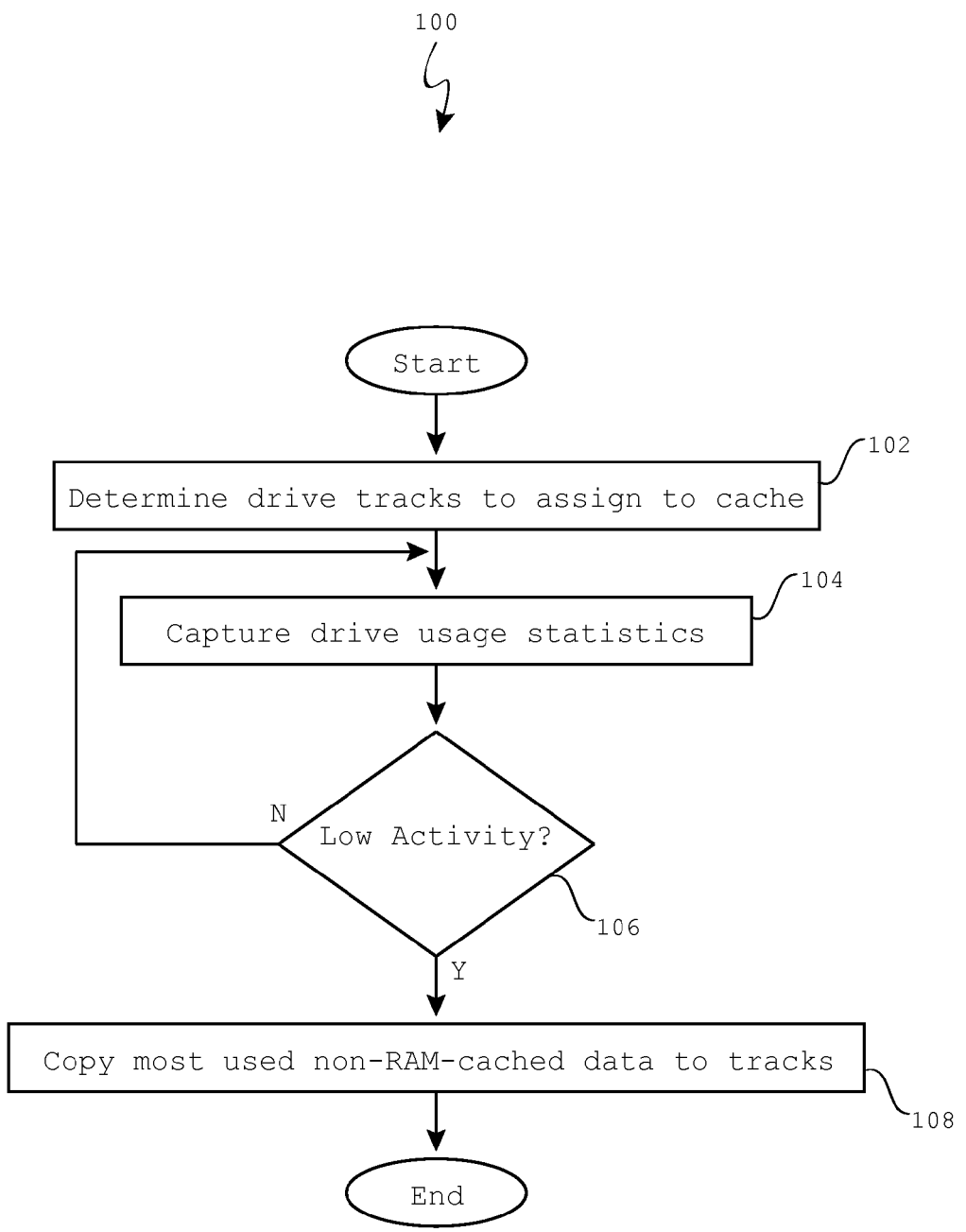
FIG. 1 illustrates a method for caching data on a hard disk drive (HDD), in accordance with embodiments of the present invention.

FIG. 1 illustrates a method 100 for caching data on a hard disk drive (HDD), in accordance with embodiments of the present invention. The method 100 begins with step 102 which comprises determining the drive tracks to assign to cache.

Conventional hard disk drives (HDDs) comprise a plurality of circular magnetized platters, an actuator arm, and a plurality of heads connected to the actuator arm which facilitate reading/writing to/from the magnetized platters. As the platters rotate the actuator arm moves across the radius of the platters to different tracks which contain data. Within each track are pluralities of sectors which contain individual data values. The combination of platter track density, rotational speed, and actuator speed contribute to an average seek time for conventional hard disk drives.

Traditionally, an average seek time is one half the time, usually measured in milliseconds, it takes a hard disk drive to move the actuator arm and heads from the inner most track on the plurality of platters to the outer most track on the platters. The average is one half this time measurement because sometimes the actuator arm and heads are resting on the precise track where the requested data resides, and other times the actuator arm and heads are in the farthest position from the requested data.

Step 102 comprises determining the drive tracks to assign to cache. In one embodiment of the present invention, step 102 determines the average seek time for the hard disk drive in which the present invention will be implemented. After determining the average seek time, step 102 selects the tracks which would reduce the average seek time for cached data to one millisecond.

For example, if the total seek time for a given hard disk drive (HDD) is twenty (20) milliseconds, the average seek time would be one half of twenty milliseconds, or ten (10) milliseconds. Step 102 would select the tracks two (2) milliseconds apart beginning with the inner most track and working towards the outer most track. By selecting tracks two (2) milliseconds apart in seek time, the data residing in these selected tracks would be on average one (1) millisecond from the actuator arm and drive heads.

In an alternative embodiment of the present invention, an end user selects the average seek time for the cached data and step 102 selects the appropriate tracks residing on the hard disk drive (HDD) which satisfy the end user's selection. After completion of step 102, the method 100 continues with step 104 which comprises capturing hard disk drive (HDD) usage statistics.

Step 104 seeks to identify the sectors which are the most read and the least written as well as not residing in random access memory (RAM) cache. More specifically, step 104 gathers statistics for each sector, the number of times said sector was read (R), as well as the number of times said sector was written (W). In one embodiment of the present invention, step 104 then calculates the average for each sector according to the function $$\text{Average} = \frac{R}{W+1}.$$

The calculation determines the average number of times a sector is read into memory before it is overwritten. After completion of step 104, the method 100 continues with step 106 which comprises determining whether the hard disk drive is in a state of low activity.

In one embodiment of the present invention, low hard disk activity is a time when the hard disk drive (HDD) is not under heavy use by an end user. For example, step 106 may be initiated at night when the end user is no longer working utilizing the hard disk drive (HDD).

In an alternative embodiment of the present invention, low hard disk activity is a time predetermined and selected by the end user. For example, the end user may select low activity for 03:00 am knowing that at this particular time the end user does not use their hard disk drive (HDD).

Regardless of the embodiment of the present invention, step 106 must determine whether the hard disk drive (HDD) is being used. In order for the present invention to efficiently cache the most read and least written sectors to the determined tracks (pursuant to step 102), the hard disk drive (HDD) must not be under heavy use. Heavy use may be a number of reads and/or writes per second as defined by the end user.

If the hard disk drive (HDD) maintains a usage exceeding a threshold provided by the end user, step 106 returns a result of 'no' and the method 100 returns to step 104 to continue capturing drive usage statistics.

However, if the hard disk drive (HDD) does not maintain a usage exceeding the threshold provided by the end user, then step 106 returns a result of 'yes' and the method 100 continues with step 108 which comprises copying the most used non-RAM-cached data sectors to the determined tracks.

Step 108 selects the sectors having the highest average value (as calculated pursuant to step 104) which currently do not reside in random access memory (RAM) cache.

In one embodiment of the present invention, the number of sectors selected by step 108 is equal to the number of sectors which may be written to the inner most track determined pursuant to step 102.

Due to the nature of hard disk drives (HDD) and the fact that inner tracks contain fewer sectors than outer tracks, the outer tracks determined pursuant to step 102 may not contain only cached sectors, the tracks may in fact additionally contain non-cached data sectors.

For example, if the number of determined tracks on a hard disk drive (HDD) platter is four, step 108 will write the most used non-RAM-cached data sectors to all four determined tracks. After writing the highest average read sectors to the determined tracks, the method 100 ends.

In an alternative embodiment of the present invention, after completion of step 108, the method 100 returns to step 104 to continue capturing drive usage statistics.

Figure 2:
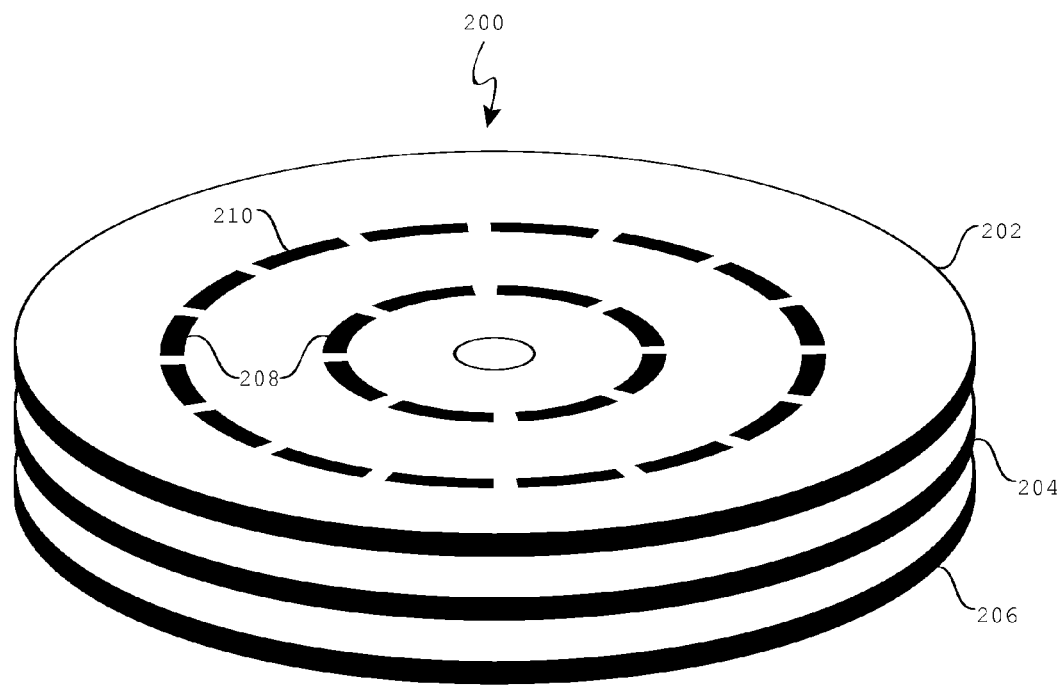
FIG. 2 illustrates a graphical representation of a hard disk drive (HDD) after utilizing the method for caching data, in accordance with embodiments of the present invention.

FIG. 2 illustrates a graphical representation 200 of a hard disk drive (HDD) after utilizing a method 100 for caching data, in accordance with embodiments of the present invention.

The representation 200 comprises a plurality of magnetic platters 202 through 206 residing on top of each other. Not depicted in the representation 200 is the actuator arm and plurality of heads.

With respect to the top most platter 202 there resides a plurality of tracks forming concentric rings from the inner most part of the platter 202 to the outer most edge of the platter 202. Within these rings reside at least one determined ring 208 (pursuant to step 104). Contained within the at least one determined track 208 resides a plurality of sectors 210 which store individual data values.

Platters 204 through 206 comprise identical determined tracks so as to facilitate more data being cached across the plurality of platters than can be achieved by a single platter.

Figure 3:
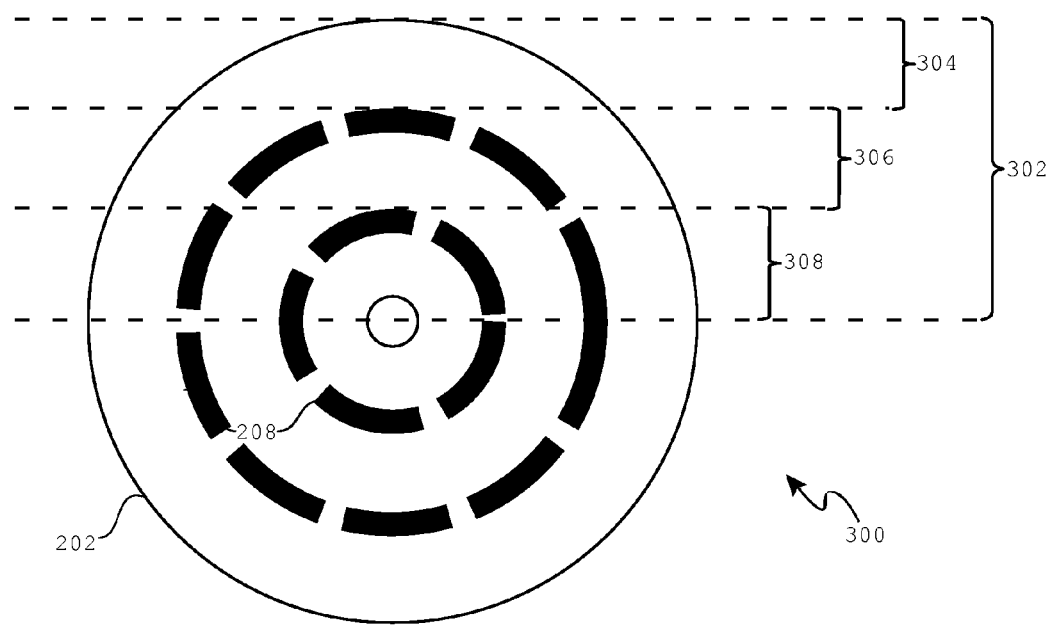
FIG. 3 illustrates an alternative graphical representation of a hard disk drive (HDD) after utilizing the method for caching data, in accordance with embodiments of the present invention.

FIG. 3 illustrates an alternative graphical representation 300 of a hard disk drive (HDD) after utilizing a method 100 for caching data, in accordance with embodiments of the present invention.

The representation 300 comprises a top-down view of a platter 202 which comprises at least one determined track 208 (determined pursuant to step 104, see FIG. 1, supra).

The representation 300 displays a unique feature of the present invention and how the at least one determined tracks 208 are selected. The distance, measured in time, from the inner most track to the outer most track of the platter 202 is represented by 302. The at least one determined tracks 208 are selected pursuant to step 104 in such a way that if the actuator arm resides anywhere within the inner and outer most tracks, the distance to a determined track 208 is a short period of time.

Specific to the present invention is the placement of the determined tracks 208 within the platter 202. The determined tracks 208 are selected in such a way that the determined tracks are equidistant from both the inner and outer track on the platter 202, but also equidistant from subsequent determined tracks.

This is represented by the distances, measured in time, identified by 304 through 308. The distance 304 from the outer most track on the platter 202 to the first determined track 208 should be identical to the distance 308 between the inner most track on the platter 202 to the last determined tracks 208. The distance 306 between the determined tracks 208 should be twice the distance of either 304 or 308. This spacing allows for a uniform average time, measured in distance, that the actuator arm needs to reach one of the determined tracks 208.

For example if distances 308 and 304 are 10 milliseconds in length, their average distance is 5 milliseconds. The average distance takes into account when the actuator arm rests on the designated track 208 having a distance of time zero (0) and when the actuator arm rests on the inner/outer most track having a distance of time ten (10). The distance 306 must be twice the distances 304 and 308 for 306 must take into account three possible actuator arm positions: resting on the inner designated track with a distance of time zero (0); resting on the outer designated track with a distance of time zero (0); and resting in the exactly between the inner and outer most designated tracks 208 having a distance of time ten (10) to either designated track. Therefore, the distance 306 must be twice the distance of 304 or 308, the distance 306 being 20 milliseconds.

Figure 4:
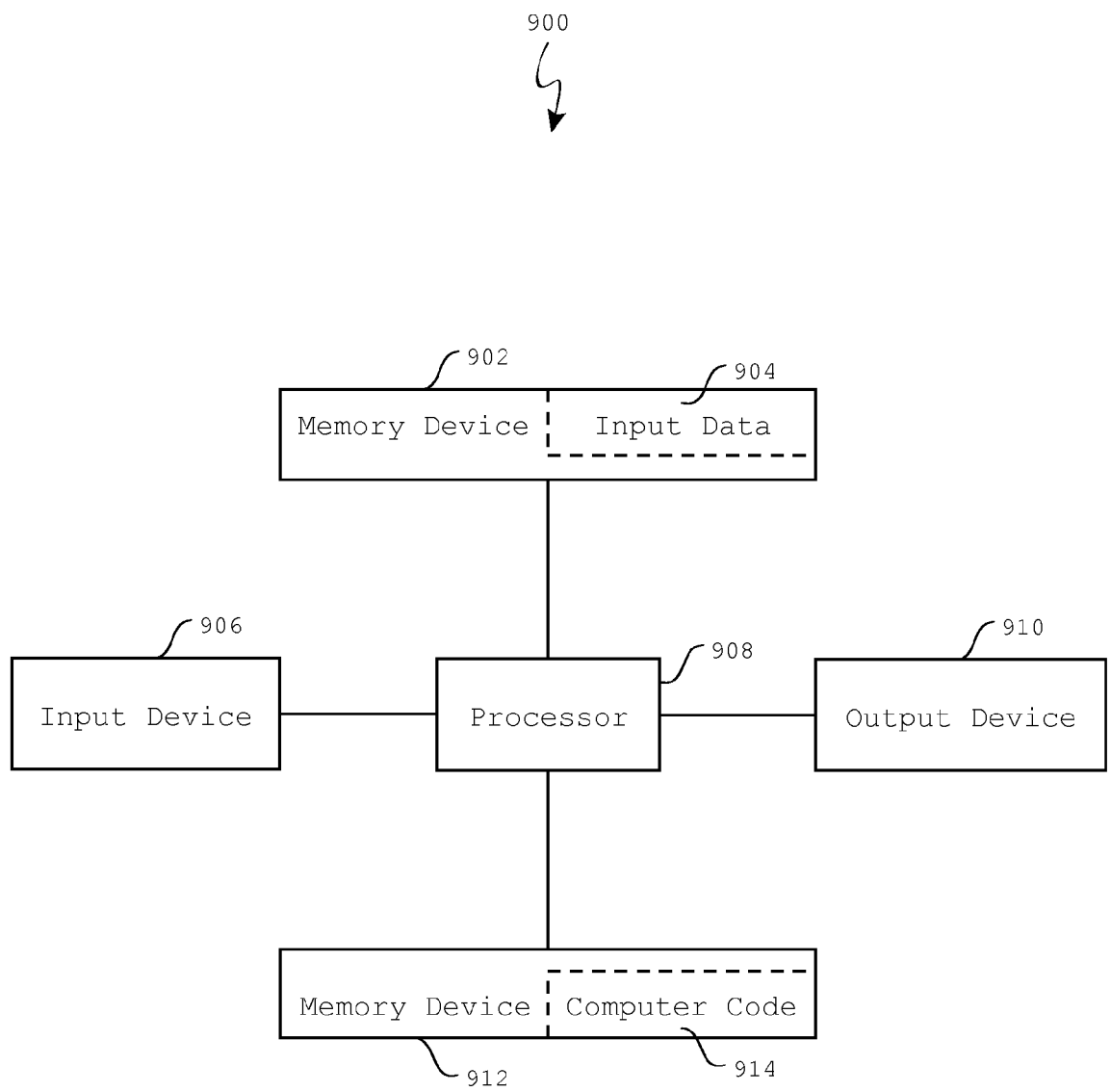
FIG. 4 illustrates a computer system which may facilitate a method for caching data on a hard disk drive (HDD), in accordance with embodiments of the present invention.

FIG. 4 illustrates a computer system 900 which may facilitate a method for caching data on a hard disk drive (HDD), in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for caching data on a hard disk drive according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for caching data on a hard disk drive. Thus, the present invention discloses a process for supporting computer infrastructure, comprising integrating, hosting, maintaining and deploying computer-readable code into a computing system (e.g., computing system 900), wherein the code in combination with the computing system is capable of performing a method for caching data on a hard disk drive.

In another embodiment, the invention provides a business method that performs the process steps of the invention on a subscription, advertising and/or fee basis. That is, a service provider, such as a Solution Integrator, can offer to create, maintain, support, etc. a process for caching data on a hard disk drive. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for caching data on a hard disk drive, said method comprising:
   identifying at least one track to devote to said caching, each track of said at least one track residing on said hard disk drive;
   determining an average for each data value both residing on said hard disk drive and not residing in random access memory, said average being the average number of times a given data value was read into memory before said given data value is overwritten;
   detecting a period of hard disk activity; and
   in response to said detecting, copying to each track of said at least one track each data value not residing in said random access memory and having an average which exceeds a first threshold.

2. The method of claim 1, said identifying further comprising:
   selecting each track of said at least one track in such a way that a distance measured in time between two consecutive selected tracks does not exceed a second threshold, said second threshold being provided by said end user prior to said selecting.

3. The method of claim 1, where said average value being calculated according to a function $$\text{Average} = \frac{R}{W+1},$$

where R is an integer representing a total number of times a given data value was read from said hard disk drive, where W is an integer representing a total number of times said given data value was written to said hard disk drive.

4. The method of claim 1, where said period of hard disk drive activity is a time established by said end user prior to said detecting.

5. The method of claim 1, where said period of hard disk drive activity is a time at which both reading from and writing to said hard disk drive falls below a third threshold, said third threshold being provided by said end user prior to said detecting.

6. The method of claim 1, where all said data values having been copied to each track of said at least one track collectively do not exceed a capacity of the inner most track of said at least one track identified according to said identifying.

7. A computer program product, comprising a computer-usable storage medium having a computer-readable program code stored therein, said computer-readable program code containing instructions that when executed by a processor of a computer system implement a method for caching data on a hard disk drive, said method comprising:
   identifying at least one track to devote to said caching, each track of said at least one track residing on said hard disk drive;
   determining an average for each data value both residing on said hard disk drive and not residing in random access memory, said average being the average number of times a given data value was read into memory before said given data value is overwritten;
   detecting a period of hard disk activity; and
   in response to said detecting, copying to each track of said at least one track each data value not residing in said random access memory and having an average which exceeds a first threshold.

8. The computer program product of claim 7, said identifying further comprising:
   selecting each track of said at least one track in such a way that a distance measured in time between two consecutive selected tracks does not exceed a second threshold, said second threshold being provided by said end user prior to said selecting.

9. The computer program product of claim 7, where said average value being calculated according to a function $$\text{Average} = \frac{R}{W+1},$$

where R is an integer representing a total number of times a given data value was read from said hard disk drive, where W is an integer representing a total number of times said given data value was written to said hard disk drive.

10. The computer program product of claim 7, where said period of hard disk drive activity is a time established by said end user prior to said detecting.

11. The computer program product of claim 7, where said period of hard disk drive activity is a time at which both reading from and writing to said hard disk drive falls below a third threshold, said third threshold being provided by said end user prior to said detecting.

12. The computer program product of claim 7, where all said data values having been copied to each track of said at least one track collectively do not exceed a capacity of the inner most track of said at least one track identified according to said identifying.

13. A computing system comprising a processor coupled to a computer-readable memory unit, said memory unit comprising a software application, said software application comprising instruction that when executed by said processor, implement a method for caching data on a hard disk drive, said method comprising:
   identifying at least one track to devote to said caching, each track of said at least one track residing on said hard disk drive;
   determining an average for each data value both residing on said hard disk drive and not residing in random access memory, said average being the average number of times a given data value was read into memory before said given data value is overwritten;
   detecting a period of hard disk activity; and
   in response to said detecting, copying to each track of said at least one track each data value not residing in said random access memory and having an average which exceeds a first threshold.

14. The computing system of claim 13, said identifying further comprising:
   selecting each track of said at least one track in such a way that a distance measured in time between two consecutive selected tracks does not exceed a second threshold, said second threshold being provided by said end user prior to said selecting.

15. The computing system of claim 13, where said average value being calculated according to a function $$\text{Average} = \frac{R}{W+1},$$

where R is an integer representing a total number of times a given data value was read from said hard disk drive, where W is an integer representing a total number of times said given data value was written to said hard disk drive.

16. The computing system of claim 13, where said period of hard disk drive activity is a time established by said end user prior to said detecting.

17. The computing system of claim 13, where said period of hard disk drive activity is a time at which both reading from and writing to said hard disk drive falls below a third threshold, said third threshold being provided by said end user prior to said detecting.

18. The computing system of claim 13, where all said data values having been copied to each track of said at least one track collectively do not exceed a capacity of the inner most track of said at least one track identified according to said identifying.

19. A process for supporting computer infrastructure, said process comprising providing at least one support service for at least one of creating, integrating, hosting, maintaining, and deploying computer-readable code in a computing system, wherein said code in combination with the computing system is capable of implementing a method for caching data on a hard disk drive, said method comprising:
   identifying at least one track to devote to said caching, each track of said at least one track residing on said hard disk drive;
   determining an average for each data value both residing on said hard disk drive and not residing in random access memory, said average being the average number of times a given data value was read into memory before said given data value is overwritten;
   detecting a period of hard disk activity; and
   in response to said detecting, copying to each track of said at least one track each data value not residing in said random access memory and having an average which exceeds a first threshold.

20. The process for supporting computer infrastructure of claim 19, said identifying further comprising:
   selecting each track of said at least one track in such a way that a distance measured in time between two consecutive selected tracks does not exceed a second threshold, said second threshold being provided by said end user prior to said selecting.

21. The process for supporting computer infrastructure of claim 19, where said average value being calculated according to a function $$\text{Average} = \frac{R}{W+1},$$

where R is an integer representing a total number of times a given data value was read from said hard disk drive, where W is an integer representing a total number of times said given data value was written to said hard disk drive.

22. The process for supporting computer infrastructure of claim 19, where said period of hard disk drive activity is a time established by said end user prior to said detecting.

23. The process for supporting computer infrastructure of claim 19, where said period of hard disk drive activity is a time at which both reading from and writing to said hard disk drive falls below a third threshold, said third threshold being provided by said end user prior to said detecting.

24. The process for supporting computer infrastructure of claim 19, where all said data values having been copied to each track of said at least one track collectively do not exceed a capacity of the inner most track of said at least one track identified according to said identifying.

* * * * *